(12) United States Patent  
Uskert et al.

(10) Patent No.: US 9,598,975 B2  
(45) Date of Patent: Mar. 21, 2017

(54) BLADE TRACK ASSEMBLY WITH TURBINE TIP CLEARANCE CONTROL

(71) Applicant: Rolls-Royce Corporation, Indianapolis, IN (US)

(72) Inventors: Richard C Uskert, Noblesville, IN (US); Joseph P Lamusga, Indianapolis, IN (US); Aaron D Sippel, Zionsville, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 650 days.

(21) Appl. No.: 14/135,443

(22) Filed: Dec. 19, 2013

(65) Prior Publication Data

US 2014/0271147 A1 Sep. 18, 2014

Related U.S. Application Data

(60) Provisional application No. 61/786,187, filed on Mar. 14, 2013.

(51) Int. Cl.
*F01D 11/22* (2006.01)
*F01D 11/24* (2006.01)
*F01D 25/24* (2006.01)

(52) U.S. Cl.
CPC .............. *F01D 11/24* (2013.01); *F01D 11/22* (2013.01); *F01D 25/246* (2013.01); *F05D 2240/11* (2013.01); *Y02T 50/672* (2013.01)

(58) Field of Classification Search
CPC ........... F01D 11/18; F01D 11/20; F01D 11/22
See application file for complete search history.

(56) References Cited

U.S. PATENT DOCUMENTS

| | | | |
|---|---|---|---|
| 3,085,398 A | | 4/1963 | Ingleson |
| 3,227,418 A | * | 1/1966 | West ....................... F01D 11/22 415/127 |
| 4,127,357 A | * | 11/1978 | Patterson ................ F01D 11/22 415/116 |
| 4,527,385 A | | 7/1985 | Jumelle et al. |
| 4,714,404 A | * | 12/1987 | Lardellier ............... F01D 11/22 15/171 |
| 4,787,817 A | * | 11/1988 | LaGrange ............... F01D 11/18 415/138 |
| 4,863,345 A | | 9/1989 | Thompson et al. |
| 5,330,321 A | | 7/1994 | Roberts et al. |

(Continued)

FOREIGN PATENT DOCUMENTS

| | | |
|---|---|---|
| EP | 1655455 A1 | 5/2004 |
| GB | 2068470 A | 8/1981 |
| WO | WO 7901008 A1 * 11/1979 ............. F01D 11/08 |

OTHER PUBLICATIONS

International Search Report for PCT International Application Serial No. PCT/US2013/076676, completed Apr. 17, 2014.

*Primary Examiner* — Woody Lee, Jr.
(74) *Attorney, Agent, or Firm* — Barnes & Thornburg LLP

(57) ABSTRACT

A turbine shroud or blade track assembly adapted to extend around a turbine wheel assembly is disclosed. The turbine shroud includes a carrier and a blade track coupled to the carrier. The blade track is movable between a radially-inward position having a first inner diameter and a radially-outward position having a second inner diameter larger than the first inner diameter.

20 Claims, 7 Drawing Sheets

(56) References Cited

U.S. PATENT DOCUMENTS

| | | | | |
|---|---|---|---|---|
| 5,593,277 | A * | 1/1997 | Proctor | F01D 11/18 |
| | | | | 415/115 |
| 5,593,278 | A * | 1/1997 | Jourdain | F01D 11/18 |
| | | | | 415/116 |
| 6,382,905 | B1 | 5/2002 | Czachor et al. | |
| 6,935,836 | B2 | 8/2005 | Ress et al. | |
| 7,210,899 | B2 | 5/2007 | Wilson | |
| 7,422,413 | B2 | 9/2008 | Matheny | |
| 7,563,071 | B2 | 7/2009 | Campbell et al. | |
| 2010/0034645 | A1 * | 2/2010 | Mulcaire | F01D 11/24 |
| | | | | 415/173.3 |
| 2010/0172754 | A1 * | 7/2010 | Flanagan | F01D 11/18 |
| | | | | 415/208.2 |
| 2016/0186611 | A1 * | 6/2016 | Vetters | F01D 25/246 |
| | | | | 415/173.2 |

* cited by examiner

BLADE TRACK ASSEMBLY WITH TURBINE TIP CLEARANCE CONTROL

CROSS-REFERENCE TO RELATED APPLICATIONS

This application claims the benefit of and priority to U.S. Provisional Patent Application Ser. No. 61/786,187, filed Mar. 14, 2013, which is incorporated by reference in its entirety herein.

FIELD OF THE DISCLOSURE

The present disclosure relates generally to gas turbine engines, and more specifically to turbine shrouds used in gas turbine engines.

BACKGROUND

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, an output shaft. Left-over products of the combustion are exhausted out of the turbine.

Compressors and turbines typically include alternating stages of static vane assemblies and rotating wheel assemblies. The rotating wheel assemblies include disks carrying blades around their outer edges. When the rotating wheel assemblies turn, tips of the blades move along blade tracks included in shrouds that are arranged around the rotating wheel assemblies.

During operation, the tips of the blades included in the rotating wheel assemblies typically move inwardly and outwardly relative to a centerline of the engine due to changes in centrifugal force and temperatures experienced by the blades. Because of this movement inwardly and outwardly relative to the centerline, turbine shrouds are often designed to allow clearance between the blade tips and the blade tracks. This clearance may allow combustion products to pass over the blades without pushing the blades, thereby contributing to lost performance within a gas turbine engine. In some designs, the blade tips contact the blade tracks arranged around the rotating wheel assemblies and cut grooves into the blade tracks further contributing to lost performance within a gas turbine engine.

SUMMARY

The present disclosure may comprise one or more of the following features and combinations thereof.

A turbine shroud or blade track assembly adapted to extend around a turbine wheel assembly is disclosed. The turbine shroud includes a carrier and a blade track coupled to the carrier. The blade track is movable between a radially-inward position having a first inner diameter and a radially-outward position having a second inner diameter larger than the first inner diameter. The movable blade track accommodates the movement of blades included in the turbine wheel assembly due to changes in centrifugal force and temperatures experienced by the blades during use of the turbine wheel assembly in a gas turbine engine.

According to one aspect of the present disclosure, a turbine shroud may include a carrier arranged around an axis, a blade track concentric with the carrier, and an actuator configured to change size in response to a change in temperature. The carrier may be formed to include a first guide slot extending outward in a radial direction from the axis and along a portion of the circumference of the carrier. The blade track may be movable between a radially-inward position having a first inner diameter and a radially-outward position having a second inner diameter larger than the first inner diameter. The actuator may be coupled to the blade track to move the blade track between the radially-inward position and the radially-outward position when the actuator changes size in response to a change in temperature.

In some embodiments, the actuator may be coupled to the carrier by a mover pin that extends from the actuator into the first guide slot so that the blade track moves along a portion of the circumference of the carrier around the axis when the actuator changes size. The mover pin may extend to a blade track segment included in the blade track to couple the blade track to the actuator. The actuator may be a ring configured to change diameter in response to a change in temperature. The actuator may be an arm configured to change length in response to a change in temperature.

In some embodiments, the carrier may be formed to include a second guide slot extending outward in a radial direction from the axis and along a portion of the circumference of the carrier. The first guide slot and the second guide slot may be arcuate when viewed in the axial direction.

In some embodiments, a guide pin may extend through a blade track segment and into the second guide slot. The carrier may include a first side wall and a second side wall spaced apart from the first side wall in an axial direction. The first guide slot may be formed in the first side wall and the second guide slot may be formed in the second side wall so that the second guide slot is spaced apart from the first guide slot in the axial direction.

In some embodiments, the blade track may include a plurality of blade track segments that move circumferentially away from one another when the blade track moves from the radially-inward position to the radially-outward position. The blade track may include a plurality of strip seals that extend circumferentially between adjacent blade track segments.

According to another aspect of the present disclosure, a turbine shroud may include a carrier arranged around an axis, a blade track concentric with the carrier, and an actuator ring arranged around the axis. The carrier may be formed to include a first guide slot extending outward in a radial direction from the axis and along a portion of the circumference of the carrier. The blade track may be movable between a radially-inward position having a first inner diameter and a radially-outward position having a second inner diameter larger than the first inner diameter. The actuator ring may be configured to change diameter in response to a change in temperature. The actuator ring may be coupled to the blade track to move the blade track between the radially-inward position and the radially-outward position when the actuator ring changes diameter in response to a change in temperature.

In some embodiments, the actuator ring may be coupled to the carrier by a mover pin that extends from the actuator ring into the first guide slot so that the actuator ring and the blade track move along a portion of the circumference of the carrier around the axis when the actuator ring changes diameter. The mover pin may extend to a blade track segment included in the blade track to couple the blade track to the actuator ring. The carrier may be formed to include a second guide slot extending outward in a radial direction from the axis and along a portion of the circumference of the carrier. A guide pin may extend through a blade track segment and into the second guide slot. The second guide slot may be spaced circumferentially apart from the first guide slot.

In some embodiments, the blade track may include a plurality of blade track segments that move circumferentially away from one another when the blade track moves from the radially-inward position to the radially-outward position. Each blade track segment may be formed to include a shroud wall that partially defines the inner diameter of the blade track and a first wall that extends outwardly in the radial direction from the shroud wall. In some embodiments, the mover pin may extend through the first wall of a blade track segment to couple the blade track segment to the actuator ring.

In some embodiments, each blade track segment may be formed to include a second wall spaced apart from the first wall in an axial direction that extends outwardly in the radial direction from the shroud wall. The carrier may be formed to include a second guide slot extending outward in a radial direction from the axis and along a portion of the circumference of the carrier. The mover pin may extend through the first wall of a first blade track segment to couple the blade track segment to the actuator ring. A guide pin may extend through the second wall of the first blade track segment and into the second guide slot.

According to another aspect of the present disclosure, a turbine shroud may include a carrier arranged around an axis, a blade track concentric with the carrier, and an actuator arm configured to change length in response to a change in temperature. The carrier may be formed to include a first guide slot extending outward in a radial direction from the axis and along a portion of the circumference of the carrier. The blade track may be movable between a radially-inward position having a first inner diameter and a radially-outward position having a second inner diameter larger than the first inner diameter. The actuator arm may be coupled to the blade track to move the blade track between the radially-inward position and the radially-outward position when the actuator arm changes length in response to a change in temperature.

In some embodiments, the actuator arm may be coupled to the carrier by a mover pin that extends from the actuator arm into the first guide slot so that the blade track moves in a radial direction when the actuator arm changes length in response to a change in temperature. The actuator arm may be coupled to the carrier for movement about a pivot axis spaced apart from the mover pin. The mover pin may be coupled to the actuator arm at a first end of the actuator arm and the pivot axis may extend through the actuator arm at a second end of the actuator arm. The mover pin may extend to a blade track segment included in the blade track to couple the blade track to the actuator arm.

In some embodiments, the carrier may be formed to include a second guide slot extending outward in a radial direction from the axis and along a portion of the circumference of the carrier. The first guide slot and the second guide slot may be arcuate when viewed in the axial direction. A guide pin may extend through a blade track segment and into the second guide slot.

In some embodiments, the carrier may include a first side wall and a second side wall spaced apart from the first side wall in an axial direction. The first guide slot may be formed in the first side wall and the second guide slot may be formed in the second side wall so that the second guide slot is spaced apart from the first guide slot in the axial direction.

In some embodiments, the blade track may include a plurality of blade track segments that move circumferentially away from one another when the blade track moves from the radially-inward position to the radially-outward position. The blade track may include a plurality of strip seals that extend circumferentially between adjacent blade track segments.

These and other features of the present disclosure will become more apparent from the following description of the illustrative embodiments.

DETAILED DESCRIPTION OF THE DRAWINGS

Figure 1:
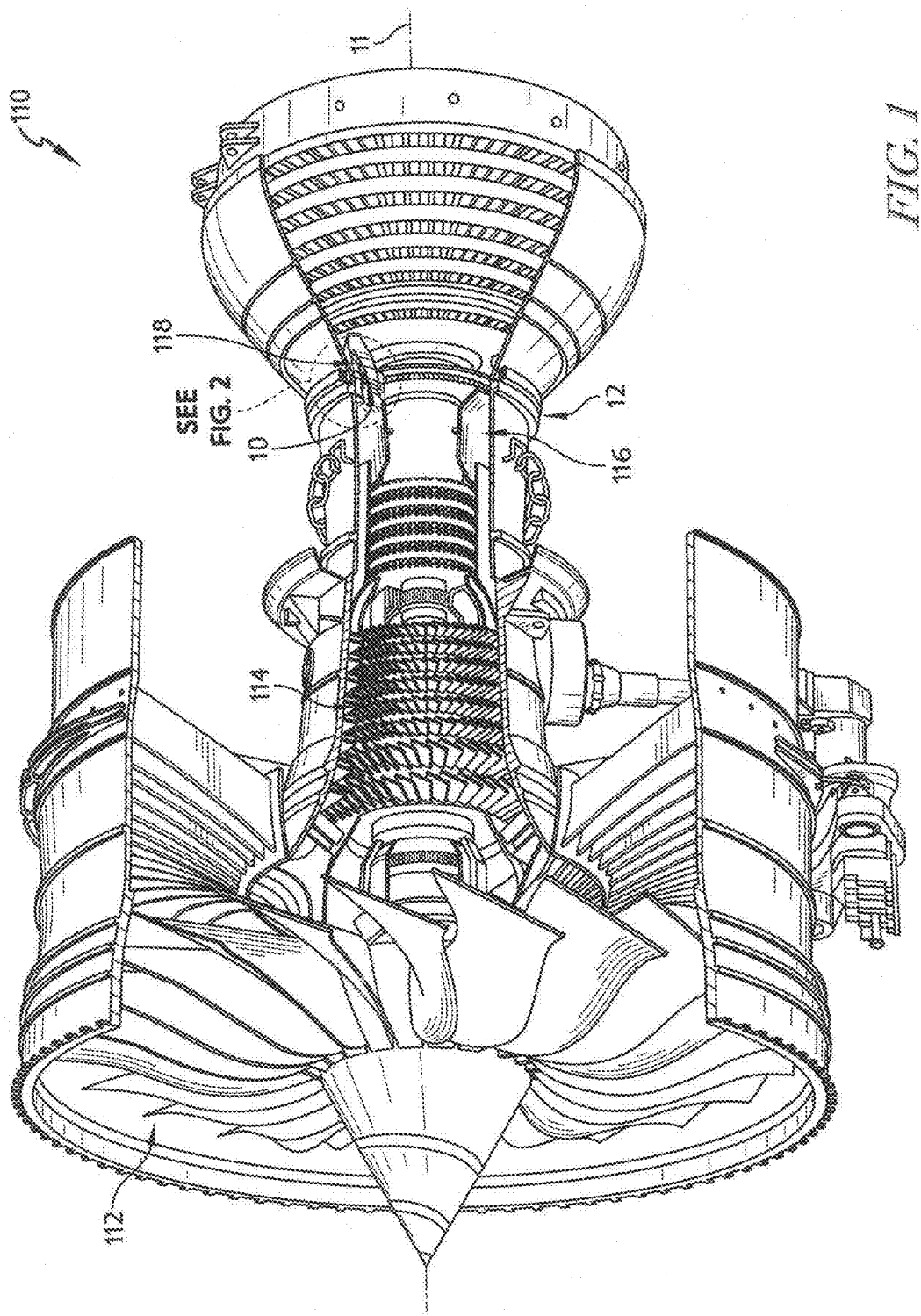
FIG. 1 is a cut-away perspective view of a gas turbine engine.

For the purposes of promoting an understanding of the principles of the disclosure, reference will now be made to a number of illustrative embodiments illustrated in the drawings and specific language will be used to describe the same.

FIG. 1 is an illustrative aerospace gas turbine engine 110 cut-away to show that the engine 110 includes a fan 112, a compressor 114, a combustor 116, and a turbine 118 all mounted to a case 120. The fan 112 is driven by the turbine 118 to provide thrust. The compressor 114 compresses and delivers air to the combustor 116. The combustor 116 mixes fuel with the compressed air received from the compressor 114 and ignites the fuel to produce hot, high-pressures gas. The hot, high-pressure gas from burning fuel in the combustor 116 is directed into the turbine 118 and the turbine 118 extracts work to drive the compressor 114 and the fan 112.

Figure 2:
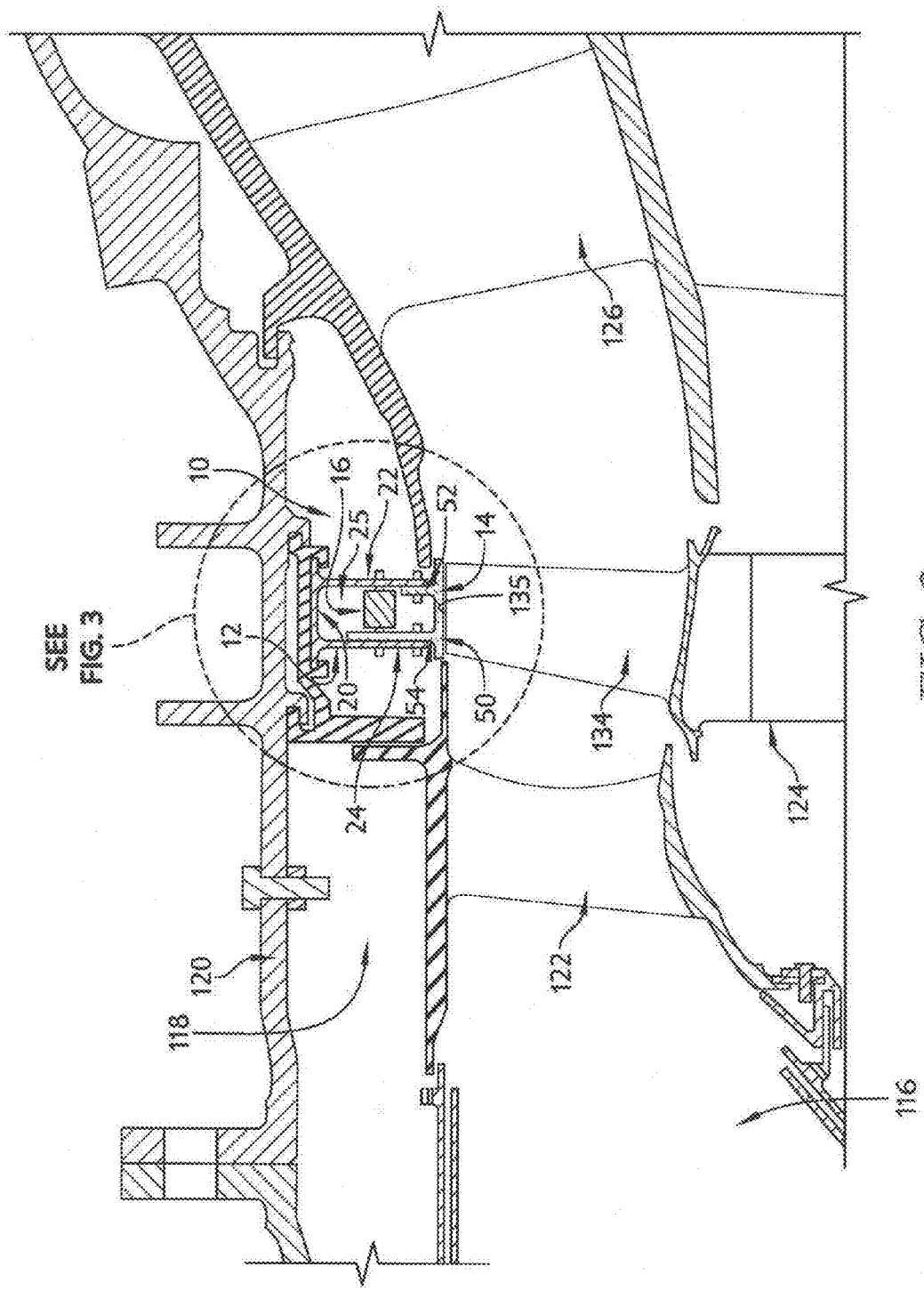
FIG. 2 is a cross-sectional view of a portion of the gas turbine engine of FIG. 1 showing that the gas turbine engine includes a turbine wheel and a turbine shroud providing a blade track extending around the turbine wheel.

The turbine 118 illustratively includes a first static vane assembly 122, a first turbine wheel assembly 124, and a second static vane assembly 126 as shown in FIG. 2. The first static vane assembly 122 extends across the flow path of the hot, high-pressure gas from the combustor 116 to direct the gas toward blades 134 included in the first turbine wheel assembly 124. The blades 134 are in turn pushed by the combustion products to cause the first turbine wheel assembly 124 to rotate; thereby, driving the rotating components of the compressor 114 and the fan 112.

Figure 3:
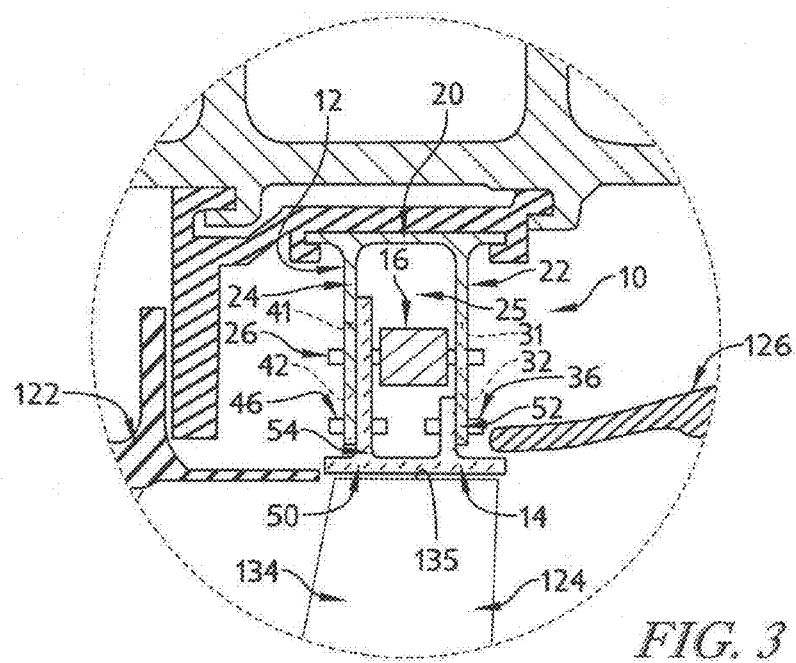
FIG. 3 is a detail view of a portion of the cross-sectional view of FIG. 2 showing that the turbine shroud includes a carrier mounted to a turbine case, the blade track coupled to the carrier and arranged around the turbine wheel, and an actuator ring coupled to both the carrier and the blade track.

The turbine 118 may also include a turbine shroud 10 with a blade track 14 that extends around the first turbine wheel assembly 124 to block combustion products from passing over tips 135 of the blades 134 without pushing the blades 134 to rotate as shown in FIGS. 2 and 3. The illustrative turbine shroud 10 may be adjustable to control the amount of blade tip clearance between the tips 135 of the blades 134 and the blade track 14 included in the turbine shroud 10. Thus, the amount of hot, high-pressure gas that is allowed to pass over the tips 135 of the blades 134 without pushing the blades 134 can be managed as the first turbine wheel assembly 124 expands and contracts during operation of the gas turbine engine 110.

Figure 4:
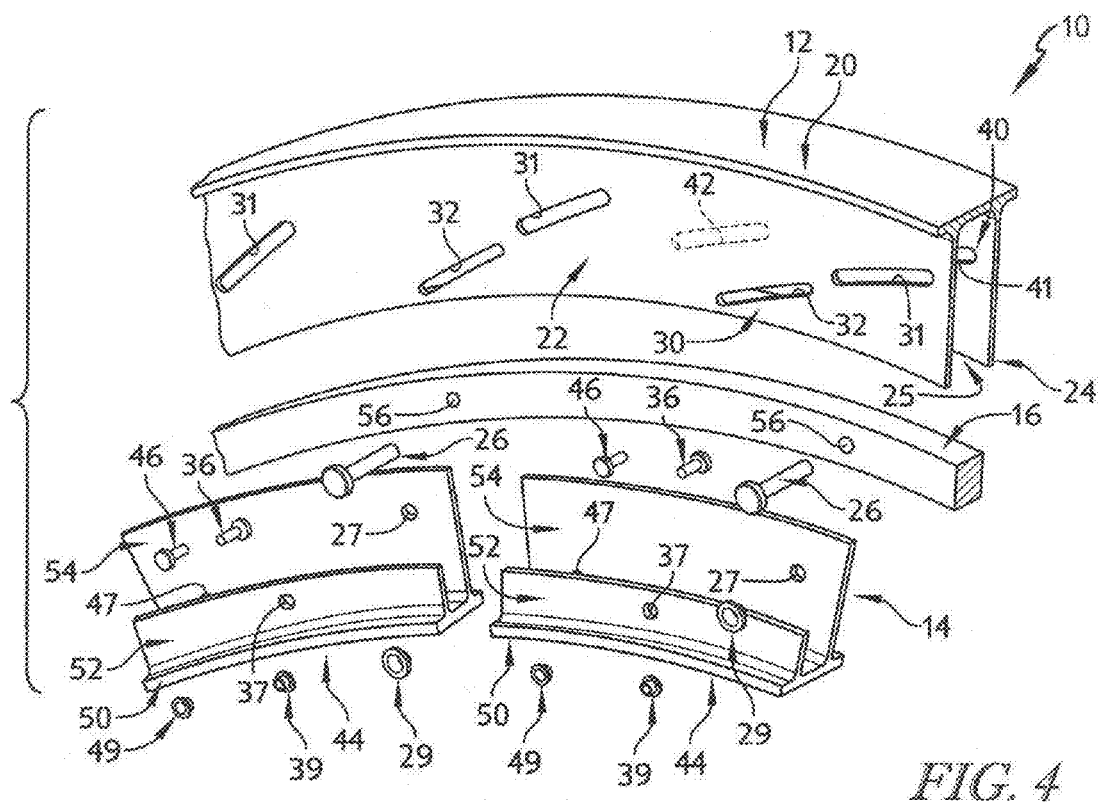
FIG. 4 is an exploded perspective view of a portion of the turbine shroud of FIG. 3 showing that the blade track is made up of a plurality of blade track segments.

The turbine shroud 10, sometimes called an adjustable blade track assembly, may include a carrier 12, the blade track 14, and an actuator ring 16 as shown, for example, in FIGS. 3 and 4. The carrier 12 may be configured to support the blade track 14 in position adjacent to the blades 134 of the first turbine wheel assembly 124 and may guide movement of the blade track 14 and actuator ring 16 during adjustment. The illustrative blade track 14 may be generally concentric with the carrier 12 and may be movable relative to the carrier 12 from a radially-inward position (shown in FIG. 5) having a relatively-small diameter to a radially-outward position (shown in FIG. 6) having a relatively-large diameter. The actuator ring 16 may be coupled to both the carrier 12 and the blade track 14 to move the blade track 14 relative to the carrier 12 outwardly and inwardly in the radial direction as the actuator ring 16 is heated to expand or cooled to contract.

Figure 5:
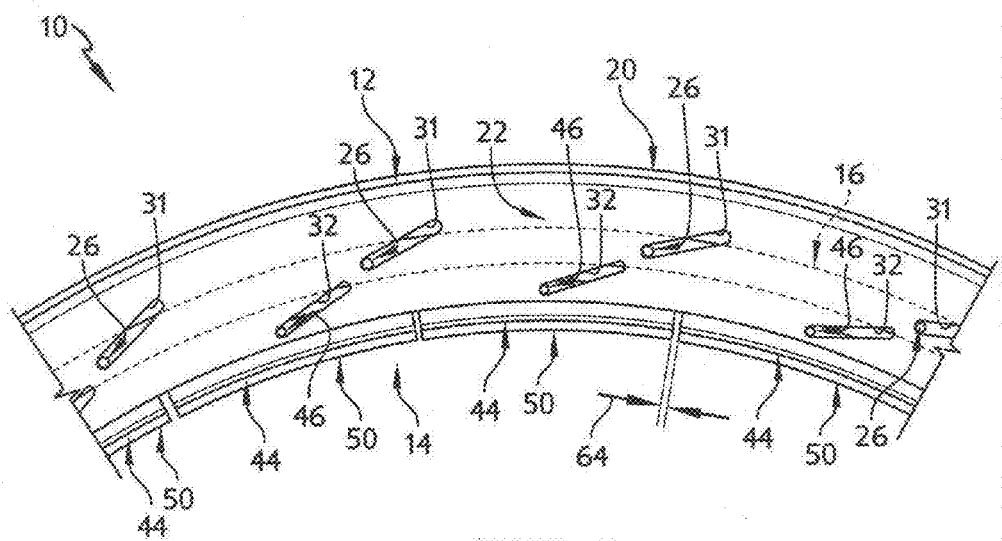
FIG. 5 is a side elevation view of a portion of the turbine shroud shown in FIG. 3 showing the blade track in a radially-inward position when the actuator ring is contracted to a relatively-small diameter.
Figure 6:
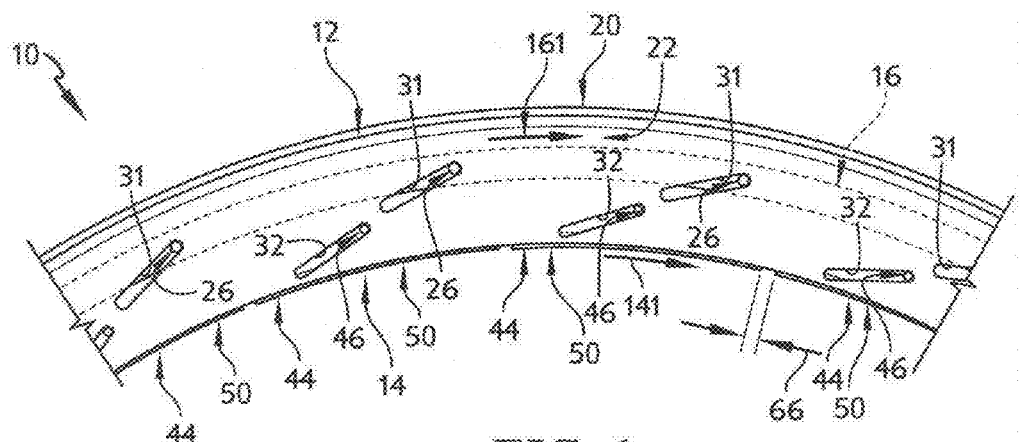
FIG. 6 is a view similar to FIG. 5 showing the blade track in a radially-outward position when the actuator ring is expanded to a relatively-large diameter.
Figure 7:
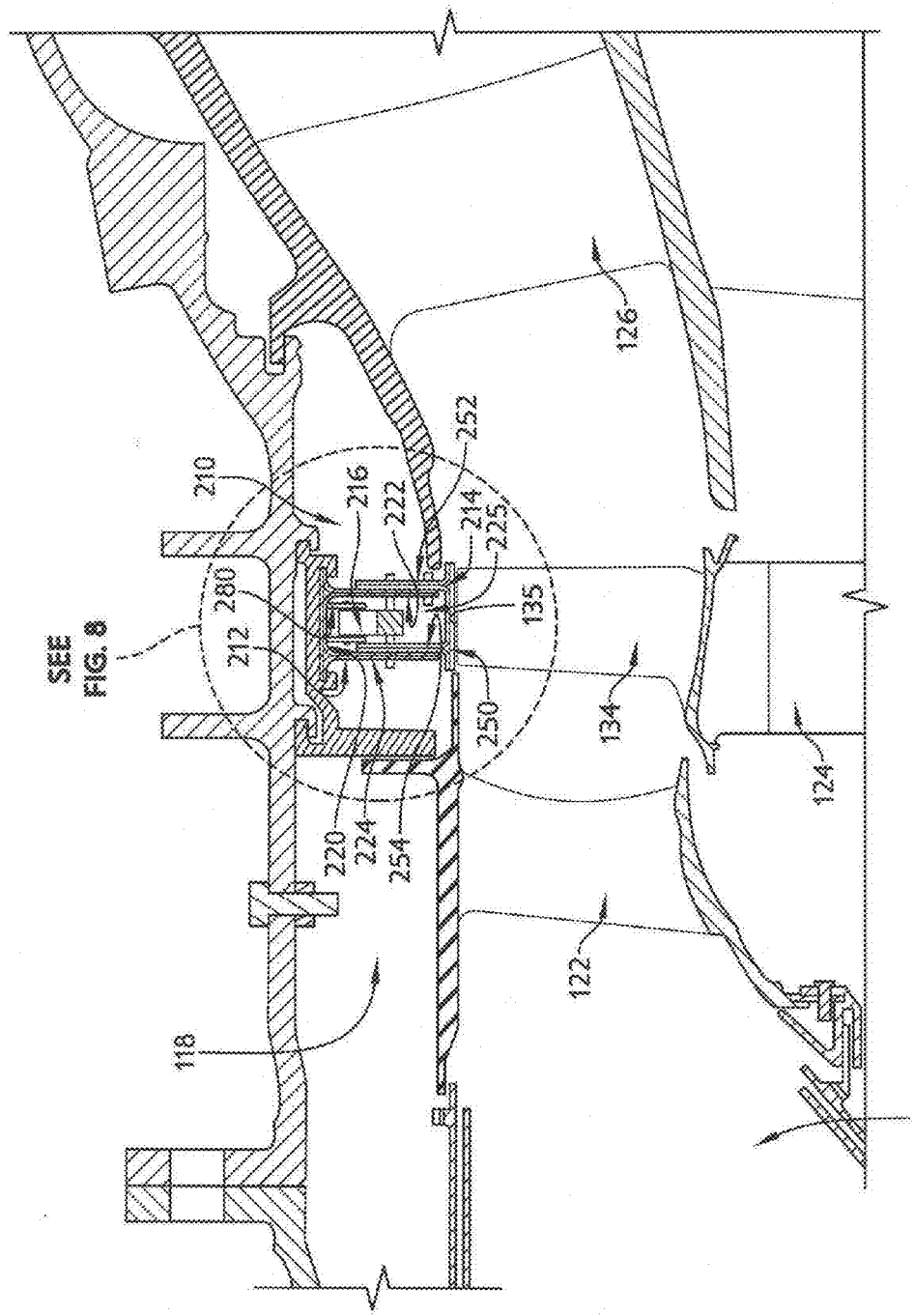
FIG. 7 is a cross-sectional view of a portion of another a turbine shroud incorporated into the gas turbine engine of FIGS. 1 and 2.

The actuator ring 16 may be coupled to the carrier 12 by a series of mover pins 26 received in guide slots 31, 41 formed in the carrier 12 as shown, for example, in FIGS. 5 and 6. The guide slots 31, 41 may extend outward in the radial direction from an axis 11 of the gas turbine engine 110 and along a portion of the circumference of the carrier 12. Thus, as the actuator ring 16 expands or contracts in diameter to move the blade track 14 outwardly or inwardly in the radial direction, the mover pin 26 may cause the actuator ring 16 and the blade track 14 coupled to the actuator ring 16 to rotate circumferentially along a portion of the circumference of the carrier 12 as suggested by arrows 141, 161 in FIG. 6.

The carrier 12 may be an annular, round metallic component and may include a top wall 20, a first side wall 22, and a second side wall 24 as shown, for example, in FIG. 4. The top wall 20 may be coupled to the case 120 of the gas turbine engine 110. The first side wall 22 and the second side wall 24 may be spaced apart from one another in the axial direction and may extend inwardly in the radial direction from the top wall 20 so that the carrier 12 forms a radially-inwardly-opening, annular channel 25. In the illustrative embodiment, the carrier 12 may be made from a number of segments and in other embodiments may be a monolithic component.

The first side wall 22 of the carrier 12 may be formed to include a series of guide slot pairs 30 having a radially-outer guide slot 31 and a radially-inner guide slot 32 as shown in FIG. 4. The second side wall 24 of the carrier 12 may be similarly formed to include a series of slot pairs 40 having a radially-outer guide slot 41 and a radially-inner guide slot 42. The radially-outer guide slots 31, 41 may be axially aligned to receive the mover pin 26 that extends axially across the carrier 12. The radially-inner guide slots 32, 42 may be spaced apart axially and may receive guide pins 36, 46 that extend to the blade track 14 to guide the blade track 14 during movement induced by expansion or contraction of the actuator ring 16. In illustrative embodiments, each guide slot 31, 32, 41, 42 may be arcuate when viewed in the axial direction. However, in other embodiments, each guide slot may be generally linear or may have another shape.

The blade track 14 may include a plurality of blade track segments 44 that cooperate to form a substantially annular blade track 14 as suggested in FIGS. 4-6. Each blade track segment 44 may be formed to include a shroud wall 50, a first wall 52, and a second wall 54 as shown in FIG. 4. The shroud wall 50 may partially define the inner diameter of the blade track 14. The first wall 52 and the second wall 54 are spaced apart axially and extend outwardly in the radial direction from the shroud wall 50. The second wall 54 may extend further in the radial direction from the shroud wall 50 than the first wall 52.

The mover pins 26 may extend through corresponding holes 27 formed in the second wall 54 of each blade track segment 44, through the actuator ring 16, and into the radially-outer guide slots 31, 41 of the carrier 12 as suggested in FIGS. 3 and 4. Thus, each blade track segment 44 is coupled to the actuator ring 16 for movement in the radial direction upon expansion or contraction of the actuator ring 16 and will rotate with the actuator ring 16 on account of the mover pins 26 captured in the radially-outer guide slots 31, 41 of the carrier 12.

The guide pins 36, 46 may extend through corresponding holes 37, 47 formed in the first wall 52 and the second wall 54 of each blade track segment 44 (respectively) and into one of the radially-inner guide slots 32, 42 formed in the carrier 12 (respectively) as suggested in FIGS. 3 and 4. Thus, each blade track segment 44 is coupled to the carrier 12 at circumferential locations spaced apart from the mover pin 26 so that each blade track segment 44 remains in proper orientation with the shroud walls 50 facing the engine centerline 11 during expansion and contraction of the actuator ring 16 as it moves the blade track 14 between the radially-inward position (shown in FIG. 5) and the radially outward position (shown in FIG. 6).

In the illustrative embodiment, the blade track segments may each be made from a ceramic material; and, more particularly, a ceramic matrix composite (CMC). For purposes of this application, a ceramic material may be any monolithic ceramic or composite in which at least one constituent is a ceramic. In other embodiments, the blade track segments 44 may be made of other metallic, non-metallic, or composite materials.

Bushings 29, 39, 49 may be mounted in corresponding holes 27, 37, 47 formed in each blade track segment 44 as suggested in FIG. 4. The bushings 29, 39, 49 may be made from a ceramic or metallic material and may provide a bearing surface upon which pins 26, 36, 46 can rotate.

The actuator ring 16 (sometimes called an expansion ring or an actuator) may be arranged in the channel 25 formed by the carrier 12 as shown in FIG. 3. The actuator ring 16 may have a rectangular cross-section and may be formed to include holes 56 through which the mover pins 26 may extend. The actuator ring 16 may be made from a metallic material selected based on the material coefficient of thermal expansion. The selected material may provide a specific amount of expansion and contraction across a temperature range corresponding to a subset of engine operating temperatures. In illustrative embodiments, the actuator ring 16 may be a monolithic annular component. However in other embodiments, the actuator ring 16 may be segmented into two or more parts that form an annular (or substantially annular) ring.

During operation of the gas turbine engine 110, the inner diameter of the blade track 14 is adjusted to control the distance (if any) between the tips 135 of the blades 134 to maintain a high level of efficiency across the turbine 118. To control the inner diameter of the blade track 14, the blade track segments 44 are moved outwardly and inwardly in the radial direction by expansion and contraction of the actuator ring 16 as suggested in FIGS. 5 and 6.

To cause expansion and contraction of the actuator ring 16, the temperature of the actuator ring 16 may be controlled by a temperature control system (not shown). As the actuation ring 16 heats or cools it will expand and contract so that the diameter of the actuation ring 16 changes. The temperature control system (not shown) may include a source of cooling air, one or more temperature sensors arranged to determine the temperature of the cooling air or the actuation ring 16, one or more flow control valves, and a controller coupled to the temperature sensors and flow control valves. The controller configured to adjust the diameter of the actuator ring 16 by controlling the cooling flow rate so that the actuator ring 16 is maintained at a selected temperature. The selected temperature can be provided in a lookup table or calculated based on the expected diameter of the first stage turbine wheel 124.

When the blade track 14 is moved to the radially-inward position shown in FIG. 5, the actuator ring 16 may have been contracted to a relatively-small diameter by cooling the actuator ring 16. Also, the pins 26, 36, 46 may be moved to a first end of the respective guide slots 27, 37, 47 that receive the pins 26, 36, 46. Further, the blade track segments 44 may be spaced circumferentially apart (if at all) a first distance 64 as shown in FIG. 5.

When the blade track 14 is moved to the radially-outward position shown in FIG. 6, the actuator ring 16 may have been expanded to a relatively-large diameter by heating the actuator ring 16. Also, the pins 26, 36, 46 may be moved to a second end of the respective guide slots 27, 37, 47 that receive the pins 26, 36, 46. Further, the blade track segments 44 may be spaced circumferentially apart a second distance 66 which is larger than the first distance 64 as shown in FIGS. 5 and 6.

Another illustrative turbine shroud 210 adapted for use in the gas turbine engine 110 is shown in FIGS. 7-10. The turbine shroud 210 is substantially similar to the turbine shroud 10 shown in FIGS. 1-6 described herein. Accordingly, similar reference numbers in the 200 series indicate several features that are common between the turbine shroud 10 and the turbine shroud 210. The description of the turbine shroud 10 is hereby incorporated by reference to apply to the turbine shroud 210, except in instances when it conflicts with the specific description and drawings of turbine shroud 210.

Figure 8:
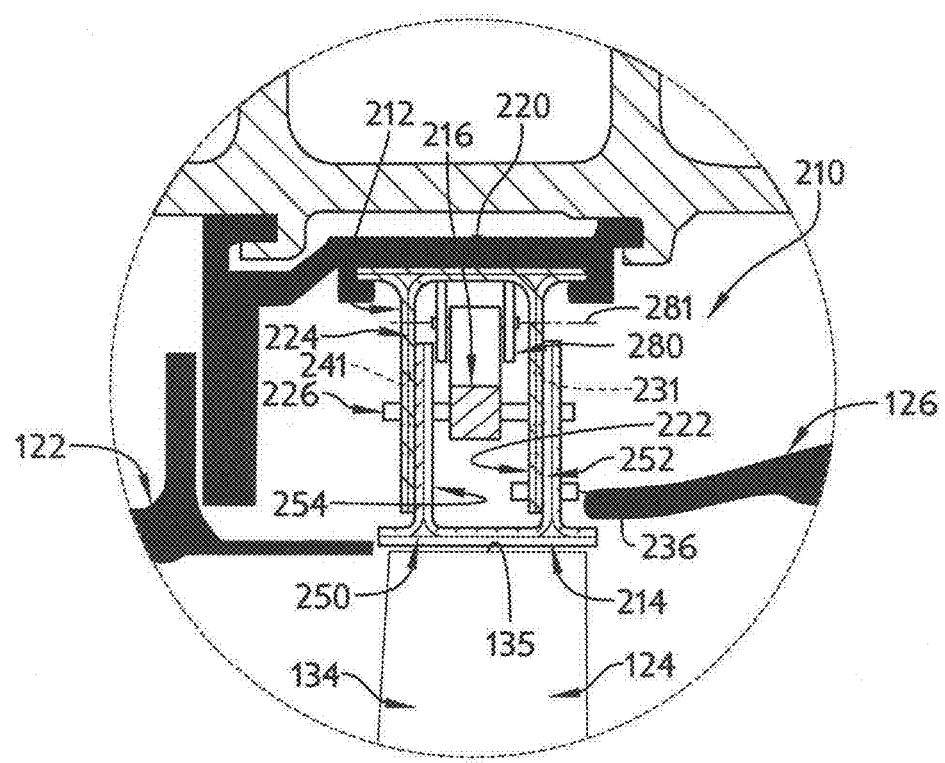
FIG. 8 is a detail view of a portion of the cross-sectional view of FIG. 7 showing that the turbine shroud includes a carrier mounted to a turbine case, the blade track coupled to the carrier and arranged around the turbine wheel, and an actuation ring coupled to both the carrier and the blade track.
Figure 9:
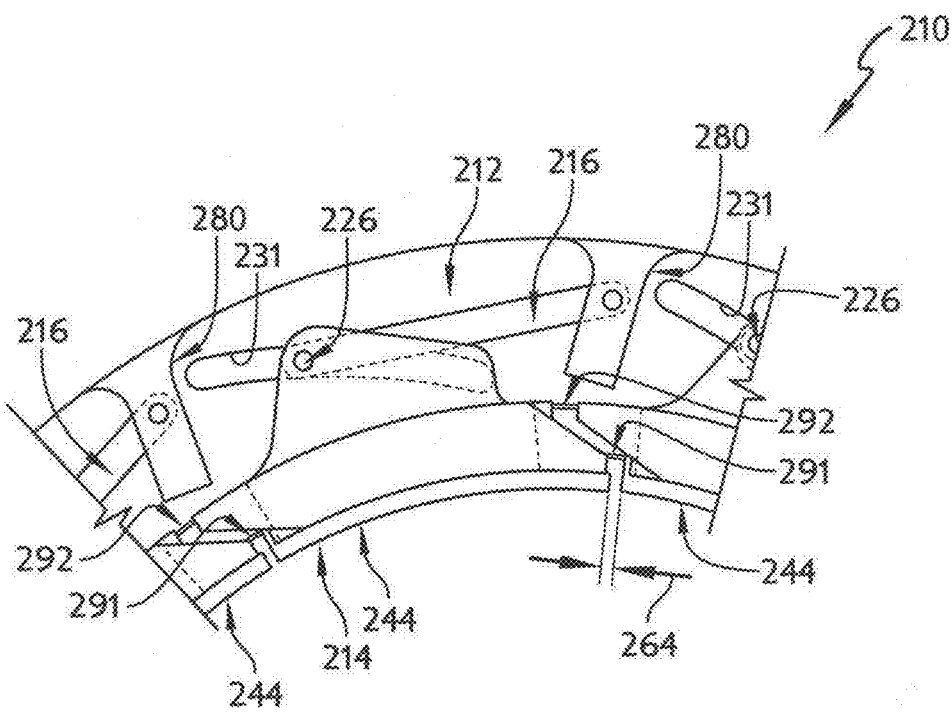
FIG. 9 is a side elevation view of a portion of the turbine shroud shown in FIG. 8 showing the blade track in a radially-inward position when the actuation arm is contracted to a relatively-short length.

Unlike the turbine shroud 10, the turbine shroud 210 includes a plurality of actuator arms 216 instead of an actuation ring 16 as shown in FIGS. 8 and 9. The actuator arms 216 may be configured to expand and contract in length to cause the blade track 214 to move between the radially-inward position and the radially-outward position.

The actuator arms 216 may be coupled to the carrier 212 by a series of mover pins 226 received in guide slots 231, 241 formed in the carrier 212 as shown, for example, in FIG. 8. The guide slots 231, 241 may extend outward in the radial direction from an axis 11 of the gas turbine engine 110 and along a portion of the circumference of the carrier 212. Thus, as the actuator arms 216 expands or contracts in length to move the blade track 14 circumferentially around a portion of the carrier 212, the mover pins 226 may cause the blade track 214 coupled to the actuator ring 216 to move radially inwardly or outwardly as suggested in FIGS. 9 and 10.

The actuator arms 216 (sometimes called expansion arms or actuators) may be arranged in the channel 225 formed by the carrier 212 as shown in FIG. 8. The actuator arms 216 may each be coupled at a first end to a pivot mount 280 attached to the top wall 220 of the carrier 212 to pivot about a pivot axis 281 relative to the carrier 212. The mover pins 226 may extend through the actuator arms 216 at a second end, opposite the first end, and into the guide slots 231, 241 of the carrier 212. The actuator arms 216 may be made from a metallic material selected based on the material coefficient of thermal expansion. The selected material may provide a specific amount of expansion/contraction across a temperature range corresponding to a subset of engine operating temperatures.

Also, unlike the turbine shroud 10, the turbine shroud 210 may not incorporate guide pins that extend from both side walls 252, 254 of each blade track segment 244 included in the blade track 214. Rather, the turbine shroud 210 may include only a single guide pin 236 that extends from the first side wall 252 of each blade track segment 244 and into a corresponding radially-inner guide slot 232 formed in the carrier 212 as shown in FIG. 8. The guide pin 236 may be spaced circumferentially apart from the mover pin 226 to help maintain proper orientation of the blade track segments 244.

During operation of the gas turbine engine 110, the inner diameter of the blade track 214 is adjusted to control the distance (if any) between the tips 135 of the blades 134 to maintain a high level of efficiency across the turbine 118. To control the inner diameter of the blade track 214, the blade track segments 244 are moved outwardly and inwardly in the radial direction by expansion and contraction of the actuator arms 216 as suggested in FIGS. 9 and 10.

To cause expansion and contraction of the actuator arms 216, the temperature of the actuator arms 216 may be controlled by a temperature control system (not shown). As the actuation arms 216 heat or cool they will expand or contract so that the length of the actuation arms 216 change. The temperature control system (not shown) may include a source of cooling air, one or more temperature sensors arranged to determine the temperature of the cooling air or the actuation arms 16, one or more flow control valves, and a controller coupled to the temperature sensors and flow control valves. The controller may be configured to adjust the length of the actuator arms 216 by controlling the cooling flow rate so that the actuator arms 216 are maintained at a selected temperature. The selected temperature can be provided in a lookup table or calculated based on the expected diameter of the first stage turbine wheel 124.

When the blade track 214 is moved to the radially-inward position shown in FIG. 9, the actuator arms 216 may have been contracted to a relatively-short length by cooling the actuator arms 216. Also, the pins 226, 236 may be moved to a first end of the guide slots 231, 232 that receive the pins 226, 236. Further, the blade track segments 244 may be spaced circumferentially apart (if at all) a first distance 264 as shown in FIG. 9.

Figure 10:
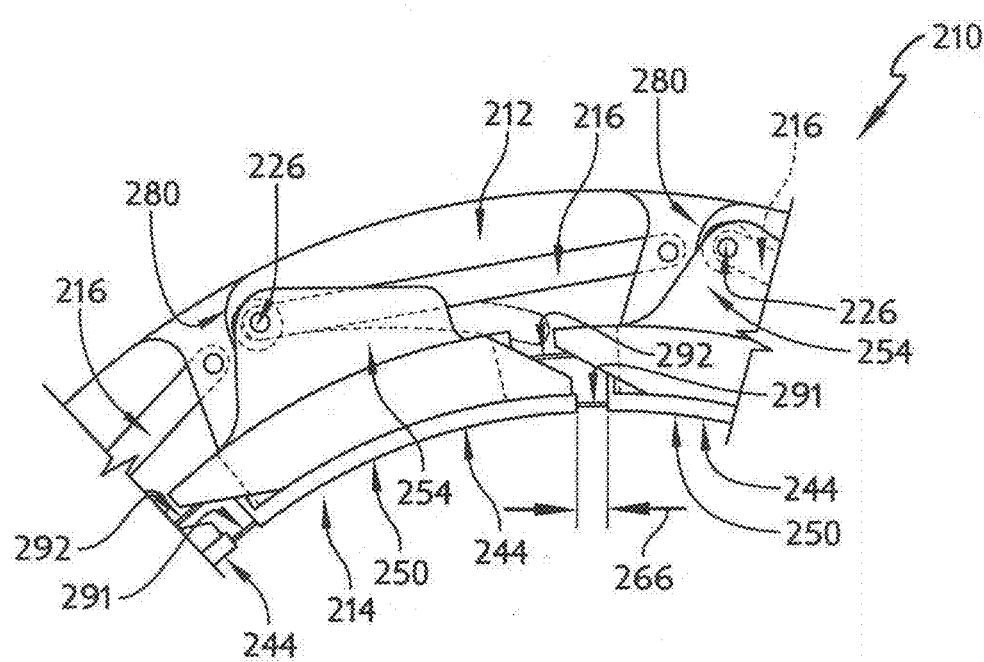
FIG. 10 is a view similar to FIG. 9 showing the blade track in a radially-outward position when the actuator ring is expanded to a relatively-long length.

When the blade track 214 is moved to the radially-outward position shown in FIG. 10, the actuator arms 216 may have been expanded to a relatively-long length by heating the actuator arms 216. Also, the pins 226, 236 may be moved to a second end of the respective guide slots 231, 232 that receive the pins 226, 236. Further, the blade track segments 244 may be spaced circumferentially apart a second distance 266 which is larger than the first distance 264 as shown in FIGS. 9 and 10.

The turbine shroud 210 may include strip seals 291, 292 that extend between circumferentially-adjacent blade track segments 244 included in the blade track 214 as shown in FIGS. 9 and 10. The strip seals 291, 292 fill the gaps between the circumferentially-adjacent blade track segments 244 and decrease air loss through the gaps. Such strip seals may be incorporated into the turbine shroud 10 in some embodiments.

While the disclosure has been illustrated and described with reference to an aerospace gas turbine engine, the teachings are also applicable for use in other types of turbine applications. For example, energy turbines, marine turbines, pumping turbines, and other types of turbines may incorporate the teachings of this disclosure without departure from the scope of the present description.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A turbine shroud comprising
a carrier arranged around an axis and formed to include a first guide slot extending outward in a radial direction from the axis and along a portion of the circumference of the carrier,
a blade track concentric with the carrier, the blade track movable between a radially-inward position having a first inner diameter and a radially-outward position having a second inner diameter larger than the first inner diameter, and
an actuator configured to change size in response to a change in temperature, the actuator coupled to the blade track to move the blade track between the radially-inward position and the radially-outward position when the actuator changes size in response to a change in temperature, wherein the actuator is coupled to the carrier by a mover pin that extends from the actuator into the first guide slot and that is configured to move along a length of the first guide slot so that the blade track moves along a portion of the circumference of the carrier around the axis when the actuator changes size.

2. The turbine shroud of claim 1, wherein the actuator is an arm configured to change length in response to a change in temperature.

3. The turbine shroud of claim 1, wherein the blade track includes a plurality of blade track segments that move circumferentially away from one another when the blade track moves from the radially-inward position to the radially-outward position.

4. The turbine shroud of claim 3, wherein the blade track includes a plurality of strip seals that extend circumferentially between adjacent blade track segments.

5. A turbine shroud comprising
a carrier arranged around an axis and formed to include a first guide slot extending outward in a radial direction from the axis and along a portion of the circumference of the carrier,
a blade track concentric with the carrier, the blade track movable between a radially-inward position having a first inner diameter and a radially-outward position having a second inner diameter larger than the first inner diameter, and
an actuator configured to change size in response to a change in temperature, the actuator coupled to the blade track to move the blade track between the radially-inward position and the radially-outward position when the actuator changes size in response to a change in temperature, wherein the actuator is coupled to the carrier by a mover pin that extends from the actuator into the first guide slot so that the blade track moves along a portion of the circumference of the carrier around the axis when the actuator changes size,
wherein the mover pin extends to a blade track segment included in the blade track to couple the blade track to the actuator.

6. A turbine shroud comprising
a carrier arranged around an axis and formed to include a first guide slot extending outward in a radial direction from the axis and along a portion of the circumference of the carrier,
a blade track concentric with the carrier, the blade track movable between a radially-inward position having a first inner diameter and a radially-outward position having a second inner diameter larger than the first inner diameter, and
an actuator configured to change size in response to a change in temperature, the actuator coupled to the blade track to move the blade track between the radially-inward position and the radially-outward position when the actuator changes size in response to a change in temperature, wherein the actuator is coupled to the carrier by a mover pin that extends from the actuator into the first guide slot so that the blade track moves along a portion of the circumference of the carrier around the axis when the actuator changes size,
wherein the actuator is a ring configured to change diameter in response to a change in temperature.

7. A turbine shroud comprising
a carrier arranged around an axis and formed to include a first guide slot extending outward in a radial direction from the axis and along a portion of the circumference of the carrier,
a blade track concentric with the carrier, the blade track movable between a radially-inward position having a first inner diameter and a radially-outward position having a second inner diameter larger than the first inner diameter, and
an actuator configured to change size in response to a change in temperature, the actuator coupled to the blade track to move the blade track between the radially-inward position and the radially-outward position when the actuator changes size in response to a change in temperature, wherein the actuator is coupled to the carrier by a mover pin that extends from the actuator into the first guide slot so that the blade track moves along a portion of the circumference of the carrier around the axis when the actuator changes size, wherein the carrier is formed to include a second guide slot extending outward in a radial direction from the axis and along a portion of the circumference of the carrier.

8. The turbine shroud of claim 7, wherein the first guide slot and the second guide slot are arcuate when viewed in the axial direction.

9. The turbine shroud of claim 7, wherein a guide pin extends through a blade track segment and into the second guide slot.

10. The turbine shroud of claim 9, wherein the carrier includes a first side wall and a second side wall spaced apart from the first side wall in an axial direction, the first guide slot is formed in the first side wall, and the second guide slot is formed in the second side wall so that the second guide slot is spaced apart from the first guide slot in the axial direction.

11. A turbine shroud comprising a carrier arranged around an axis and formed to include a first guide slot extending outward in a radial direction from the axis and along a portion of the circumference of the carrier, a blade track concentric with the carrier, the blade track movable between a radially-inward position having a first inner diameter and a radially-outward position having a second inner diameter larger than the first inner diameter, and an actuator ring arranged around the axis and configured to change diameter in response to a change in temperature, the actuator ring coupled to the blade track to move the blade track between the radially-inward position and the radially-outward position when the actuator ring changes diameter in response to a change in temperature, wherein the actuator ring is coupled to the carrier by a mover pin that extends from the actuator ring into the first guide slot so that the actuator ring and the blade track move along a portion of the circumference of the carrier around the axis when the actuator ring changes diameter.

12. The turbine shroud of claim 11, wherein the mover pin extends to a blade track segment included in the blade track to couple the blade track to the actuator ring.

13. The turbine shroud of claim 11, wherein the carrier is formed to include a second guide slot extending outward in a radial direction from the axis and along a portion of the circumference of the carrier.

14. The turbine shroud of claim 13, wherein a guide pin extends through a blade track segment and into the second guide slot.

15. The turbine shroud of claim 13, wherein the second guide slot is spaced circumferentially apart from the first guide slot.

16. The turbine shroud of claim 11, wherein the blade track includes a plurality of blade track segments that move circumferentially away from one another when the blade track moves from the radially-inward position to the radially-outward position.

17. The turbine shroud of claim 16, wherein each blade track segment is formed to include a shroud wall that partially defines the inner diameter of the blade track and a first wall that extends outwardly in the radial direction from the shroud wall.

18. The turbine shroud of claim 17, wherein the mover pin extends through the first wall of a blade track segment to couple the blade track segment to the actuator ring.

19. The turbine shroud of claim 17, wherein each blade track segment is formed to include a second wall spaced apart from the first wall in an axial direction that extends outwardly in the radial direction from the shroud wall.

20. The turbine shroud of claim 19, wherein the carrier is formed to include a second guide slot extending outward in a radial direction from the axis and along a portion of the circumference of the carrier, the mover pin extends through the first wall of a first blade track segment to couple the blade track segment to the actuator ring, and a guide pin extends through the second wall of the first blade track segment and into the second guide slot.

* * * * *